United States Patent [19]
Gonzalez

[11] Patent Number: 5,752,541
[45] Date of Patent: May 19, 1998

[54] DIVERTER VALVE

[75] Inventor: Teodoro J. Gonzalez, Sheboygan, Wis.

[73] Assignee: Kohler Co., Kohler, Wis.

[21] Appl. No.: 586,446

[22] Filed: Jan. 16, 1996

Related U.S. Application Data

[63] Continuation-in-part of Ser. No. 413,666, Mar. 30, 1995, abandoned.

[51] Int. Cl.[6] ............................................. F16K 11/06
[52] U.S. Cl. .............................. 137/119.04; 137/454.2; 137/512.3
[58] Field of Search ...................... 137/119.03, 119.04, 137/119.08, 454.2, 512.3

[56] References Cited

U.S. PATENT DOCUMENTS

| Re. 32,981 | 7/1989 | Marty | 137/119 |
|---|---|---|---|
| 2,608,412 | 8/1952 | Bletcher et al. | 277/21 |
| 2,652,850 | 9/1953 | Manville | 137/218 |
| 2,956,579 | 10/1960 | Moore et al. | 137/218 |
| 3,056,418 | 10/1962 | Adams et al. | 137/119 |
| 3,286,721 | 11/1966 | Cravits | 137/218 |
| 3,471,872 | 10/1969 | Symmons | 4/145 |
| 3,472,279 | 10/1969 | Sanderson | 137/625 |
| 3,736,959 | 6/1973 | Parkison | 137/625 |
| 3,875,960 | 4/1975 | Miller | 137/119 |
| 4,008,732 | 2/1977 | Fichter et al. | 137/119 |
| 4,316,485 | 2/1982 | Christiansen et al. | 137/625.4 |
| 4,609,006 | 9/1986 | Parkison et al. | 137/119 |
| 4,798,221 | 1/1989 | Crawford et al. | 137/119 |
| 4,934,402 | 6/1990 | Tarnay et al. | 137/119 |
| 5,213,131 | 5/1993 | Gnauert et al. | 137/218 |

FOREIGN PATENT DOCUMENTS

| 0 641 962 | 3/1995 | European Pat. Off. . |
|---|---|---|
| 2 292 168 | 6/1976 | France . |
| 2 444 872 | 7/1980 | France . |
| 583035 | 10/1958 | Italy . |
| WO 86/03272 | 6/1986 | WIPO . |
| WO 90/02282 | 3/1990 | WIPO . |

*Primary Examiner*—John Rivell
*Attorney, Agent, or Firm*—Quarles & Brady

[57] ABSTRACT

A diverter valve for a faucet having a spray function is provided. The diverter valve includes a seal to engage a valve housing and prevent back siphonage. There is also a piston head and valve seat in the diverter valve to provide secondary protection against back flow.

6 Claims, 3 Drawing Sheets

DIVERTER VALVE

CROSS REFERENCE TO RELATED APPLICATIONS

This is a continuation-in-part of application Ser. No. 08/413,666 filed Mar. 30, 1995 now abandoned.

BACKGROUND OF THE INVENTION

1. Field of the Invention

This invention relates primarily to faucets. More particularly, the invention relates to diverter valves for use with faucets having a spout outlet, a separate spray outlet and an antisiphonage feature.

2. Description of the Art

Hand spray functions in conjunction with kitchen faucets have been in existence for over fifty years. An outlet valve on a pull-out spray typically causes a water pressure change that activates a diverter valve to shut off flow to a spout while the spray is operating.

Prior art diverter valves for such purposes have shortcomings in that they have a tendency to clog with foreign particles. Even some designs which have incorporated by-pass paths to minimize clogging problems have difficulties with manufacturing tolerances. Most other diverters do not provide one hundred percent spout shut off. There is also the problem with prior art diverters in that they are difficult to assemble and/or machine. Others have installation problems into the valve body. Accessibility, complexity, and high costs have also been a problem. Further, there can be problems incorporating and providing sufficient antisiphonage protection in such systems.

SUMMARY OF THE INVENTION

In one aspect, the invention provides a faucet with a housing having a fluid inlet leading to a first cavity and a fluid outlet leading from the first cavity. A valve unit is positioned in the first cavity for regulating a flow of fluid between the inlet and outlet. The outlet has a first branch leading to a spout, a second branch leading to a spray member with a second cavity at the intersection of the two branches. A diverter valve is positioned in or adjacent the second cavity, the diverter valve having a sleeve in radial sealing engagement with the first branch, and having an axial passage through the sleeve. A valve member is operatively connected to the sleeve for reciprocal movement relative thereto, the valve member including a first head for opening and closing the passage through the sleeve in one direction. The valve member further includes a second head having a one way seal valve in sealing engagement with the second branch with the second head. Importantly, the second head is also constructed and arranged for positive contact with a valve seat on the sleeve.

When the spray member is closed, the first head is forced to move away from a sealing position and allow fluid flow to the spout. When the spray member is open, fluid pressure will cause the diverter valve to close off fluid from entry to the spout and allow fluid flow past the second head into the spray member. In the event of a pressure failure in the fluid inlet, reverse fluid flow from the spray is prevented from the spray to the second cavity by the one way seal sealing against a surface of the second branch with back-up protection afforded by the contact of the second head with the valve seat of the sleeve.

Preferably, the valve member includes a neck portion interconnecting the first and second heads. In another aspect, the second head is of a larger diameter than the first head. In yet another aspect, the valve has guide flanges for guiding reciprocal movement of the valve member in the sleeve. In another embodiment, the sleeve valve unit includes a waist having a reduced diameter portion with at least one opening positioned adjacent the second cavity.

The objects of the invention therefore include:

a. providing a diverter member of the above kind which reduces the risks of back siphonage without requiring check valves on the spray unit or line to the spray;

b. providing a diverter member of the above kind which can easily and efficiently be installed;

c. providing a diverter member of the above kind which can be manufactured with few parts and thus at reduced costs;

d. providing a diverter member of the above kind which can be easily assembled;

e. providing a diverter member of the above kind which affords complete shut off of a valve spout; and f. providing a diverter member of the above kind which can be assembled or retrofitted into a variety of valve housings.

These and still other objects and advantages of the invention will be apparent from the description which follows. In the detailed description below, a preferred embodiment of the invention will be described in reference to the accompanying drawings. The embodiment does not represent the full scope of the invention. Rather the invention may be employed in other embodiments.

DESCRIPTION OF THE PREFERRED EMBODIMENT

Figure 1:
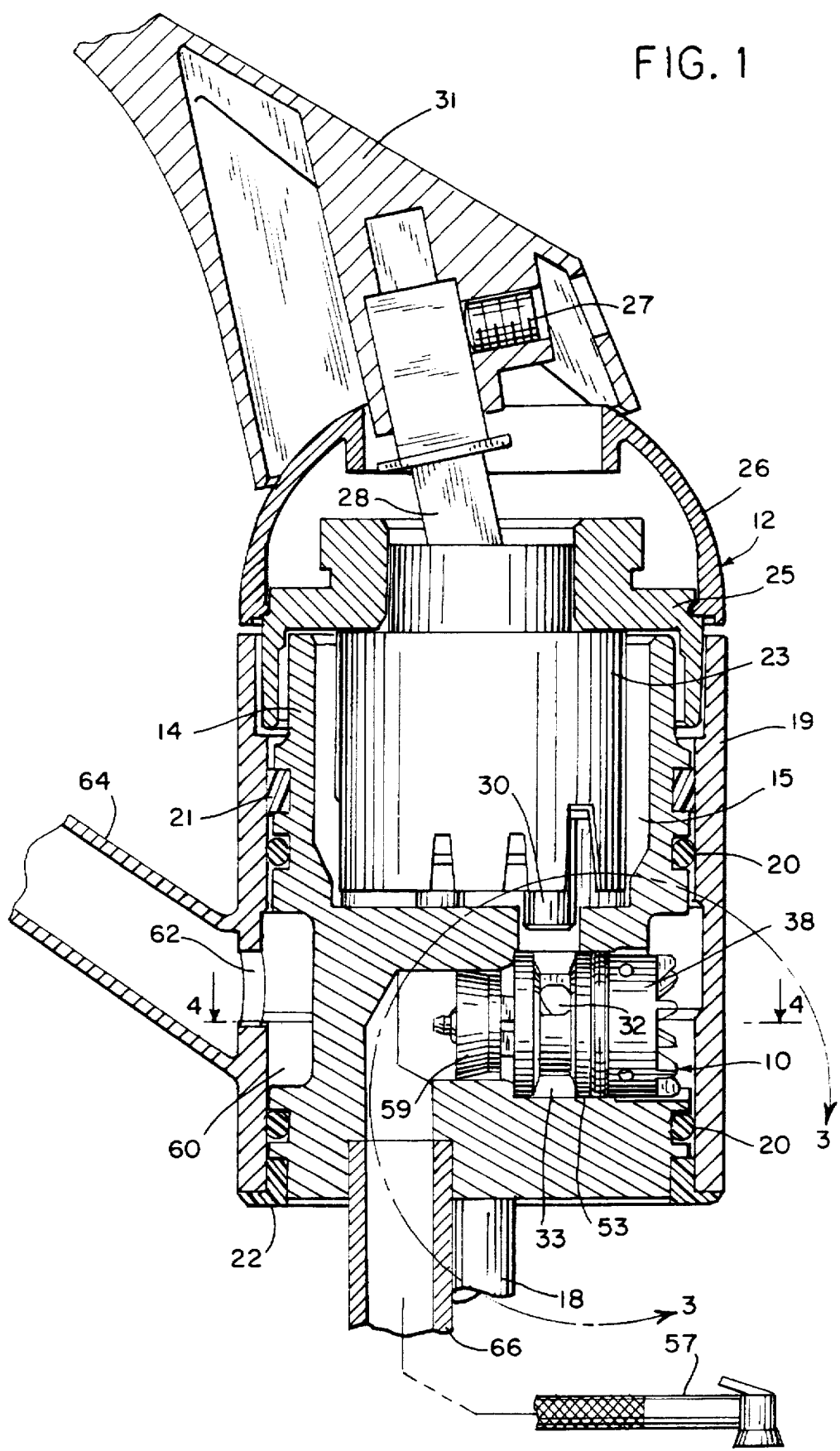
FIG. 1 is a sectional view showing a faucet employing the diverter valve of this invention.
Figure 2:
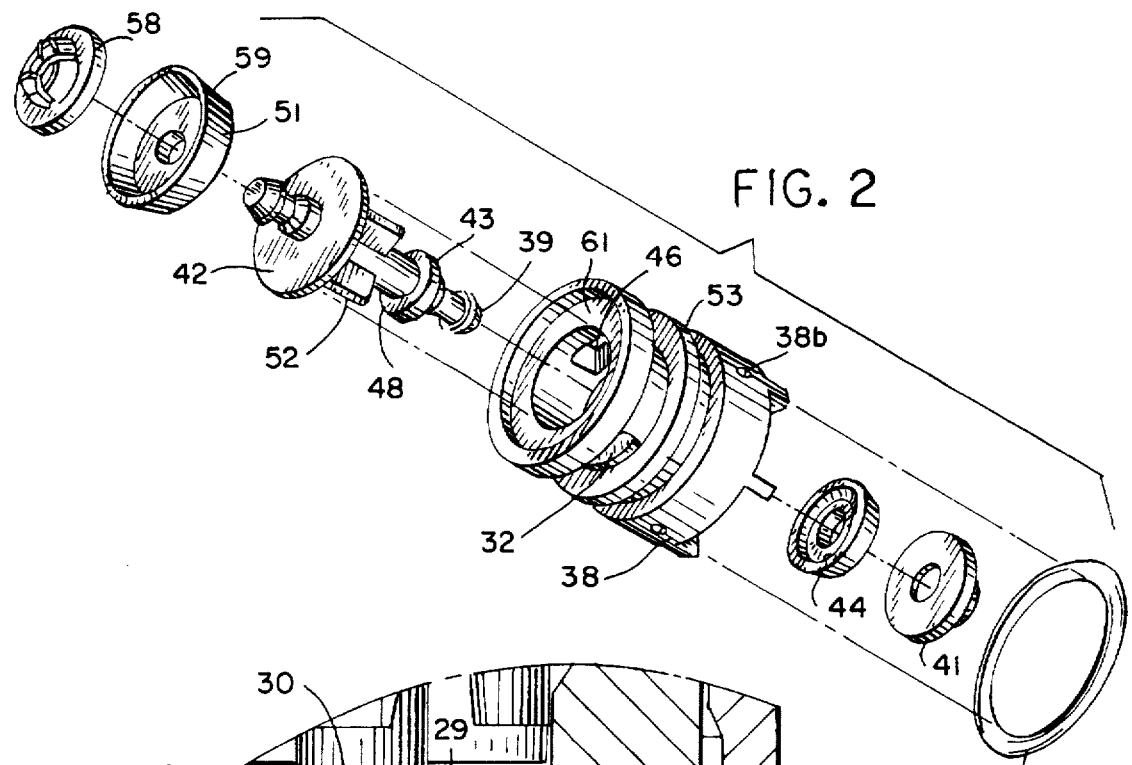
FIG. 2 is an exploded perspective view of the diverter valve parts shown in FIGS. 3 and 5.
Figure 3:
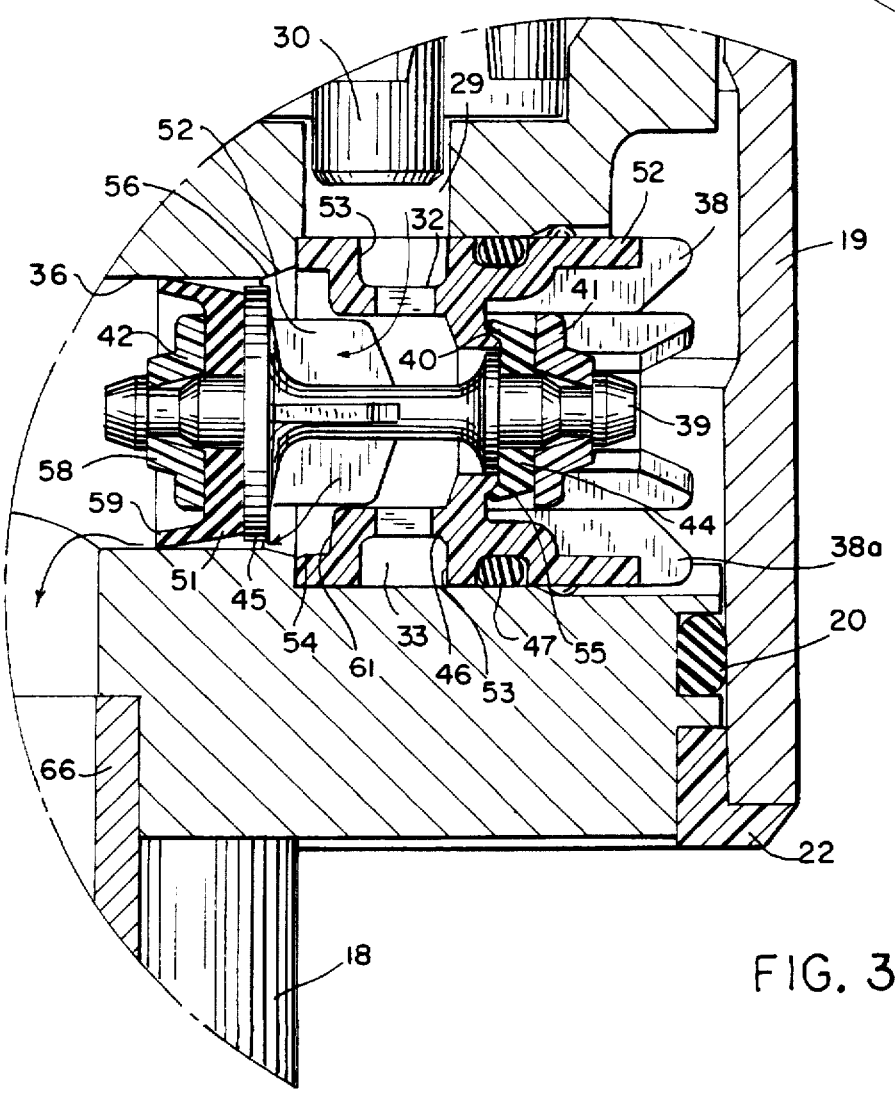
FIG. 3 is an enlarged sectional view taken along line 3—3 of FIG. 1 and showing the diverter valve in one mode of operation.
Figure 4:
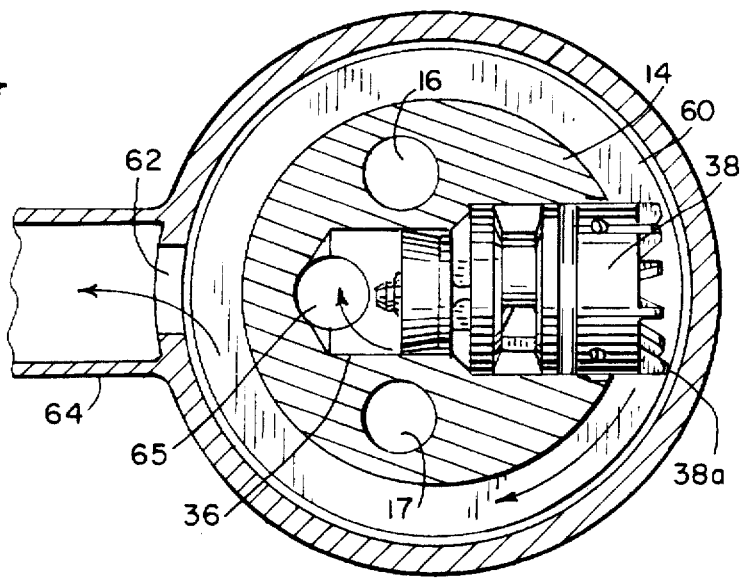
FIG. 4 is a sectional view taken along line 4—4 of FIG. 1.

Referring to FIGS. 1 and 4, the diverter valve, generally 10, is shown in conjunction with a faucet, generally 12, having a housing 14 with a cavity 15. There are hot and cold water passages 16 and 17 in the housing 14 to supply hot and cold water to the cavity 15 such as by the cold water pipe 18. A cartridge valve 23 is seated in the cavity 15 and retained therein by the mounting nut 25 over which is placed the bonnet 26. Valve 23 is of the ceramic disk type having a stationary disk with hot and cold water passages extending therethrough and a movable disk operable by the stem 28. Stem 28 is connected to a handle 31 such as by the screw 27. Water flows from the valve 23 through the outlet orifice 30 and into outlet passage 29 where it enters a second and non-coaxial junction passage 33 in the valve housing 14. A valve sleeve 19 surrounds the valve body 14 and is sealed thereto by O-rings 20 and seals 21 and 22.

Referring to FIGS. 2–5, it is seen that junction passage 33 joins with a first outlet branch 35 and a second outlet branch 36. The diverter valve 10 is placed in the cavity 33 and has a sleeve 38 sealably engaged in the first branch 35 by the O-ring 47. The diverter valve 10 is held in position in housing 14 by the valve sleeve 19 and the projections 38a extending from sleeve 38 for retentive contact with an inwardly extending wall portion 19a. This retention is also aided by the frictional protrusions 28b on the sleeve 38. A poppet type valve member 42 has opposing piston heads 43 and 45 with head 43 having a seal member 44 connected thereto such as by the cap 41 frictionally engaged over the enlarged head 39. As shown specifically in FIG. 3, the seal member 44 is in sealing engagement with a valve seat 55 in the sleeve 38, adjacent the passage 40.

Valve member 42 has a neck portion 48 which connects the opposing piston heads 43 and 45. Guide flanges 52 extend from the neck portion 48 to provide a guide surface for the neck portion 48 in the sleeve 38. The sleeve 38 has a waist or reduced diameter portion 53 with opposing openings 32 and 46 which allows water to enter inside the sleeve 38. A seal member 51 is connected to the piston head 45 by the connector cap 58. It has a lip 59 for sealable engagement in the second outlet branch 36. A tapering wall 56 extends between wall 54 and the second outlet branch 36.

Figure 5:
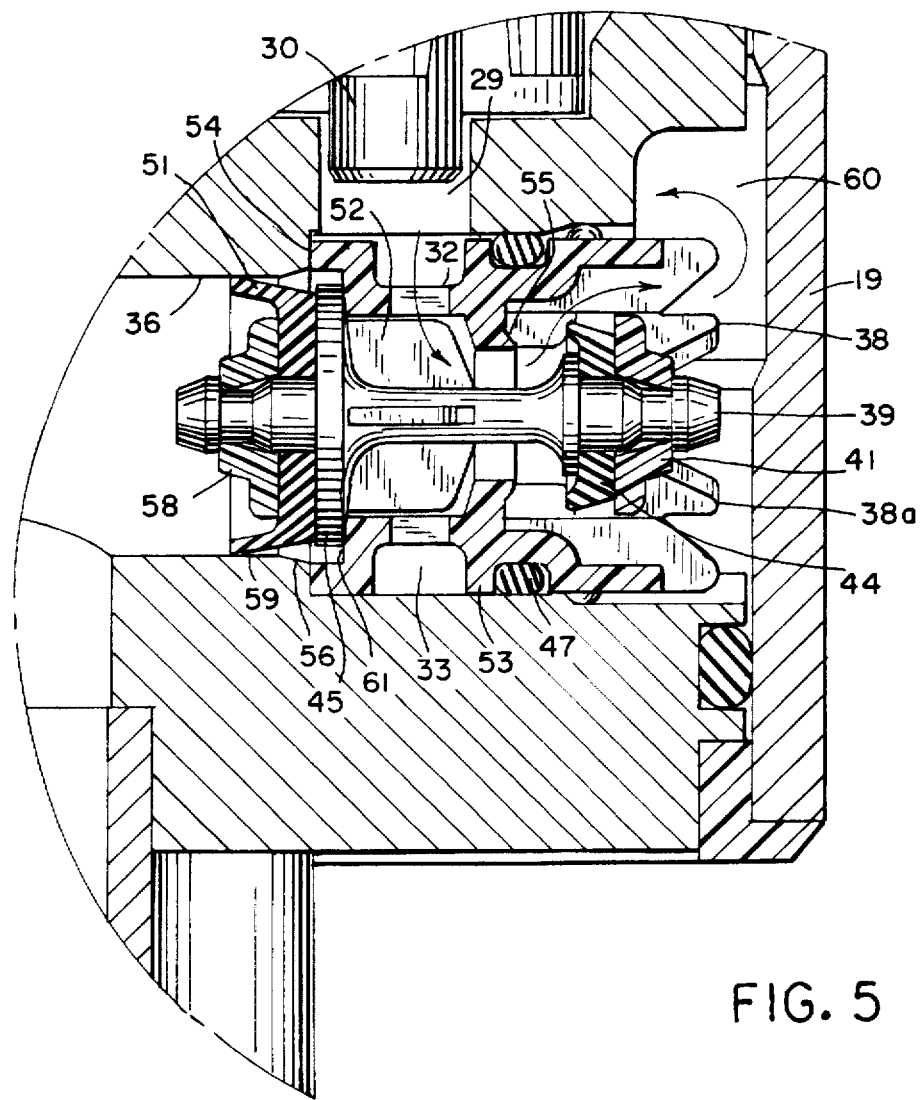
FIG. 5 is a view similar to FIG. 3 showing the diverter valve in another mode of operation.

FIG. 5 shows the diverter valve in a spout open condition with water flowing from cartridge valve 23. In this instance the spray nozzle 57 is attached to a spray outlet line 66 communicating with the second outlet branch 36 by the passage 65 as seen in FIG. 4. The spray nozzle 57 would be closed. Water pressure builds in the cavity 33, thus forcing the valve member 42 to move to the right as viewed in FIG. 5, and thereby moves the seal member 44 away from the valve seat 55 and allows the flow of water to pass in the direction of the flow arrows. Water flows around the piston seal 44 from the sleeve 38, into a passage 60 in the valve body 14 and to the opposite side where, as seen in FIG. 1, it flows through the aperture 62 and ultimately into the spout 64 extending from sleeve 19.

In the instance where the spray nozzle 57 would be in an open condition, water flows through the spray outlet line 66. This condition would cause the valve member 42 to move to the left as viewed in FIG. 3, thus closing the pathway, including passage 40, through the sleeve 38 as the seal member 44 now sealably engages the valve seat 55. However, water is free to flow around the outside of piston head 45 and seal 51. This is effected by an inward deflection of the lip 59 as fluid flows from cavity 33 to passage 65 when the valve 10 is in a spray open condition.

Diverter valve 10 offers the advantage of an antisiphonage feature. This is effected by the seal 51 with lip 59. Back flow from spray nozzle 57 is prevented should it be left in dirty water and there is a loss of pressure in the water supply passages 16 and 17. An important feature of the invention is the sealing effected by seal 51 and lip 59 engaging the branch line 36 and the additional sealing effected by the abutment of the piston head 45 with the seat 61 of the sleeve 38. This serves as an additional closure.

It will therefore be appreciated that a diverter 10 is provided wherein a complete shut off of water is effected to the spout while the spray nozzle function is taking place. This is effected by the movement of the piston head 43 and the seal member 44 against the valve seat 55 in response to the fluid pressure on the larger piston head 45. In addition, there is an ease of assembly in that the valve member 42 is quickly assembled into the sleeve 38 and guide flanges 52 into the bore of the sleeve 38. The valve seal member 44 is then passed over the enlarged head 39 and the cap 41 secured thereon. This then captures the valve member 42 in the sleeve 38. Similarly seal member 51 is passed over enlarged piston head 45 and cap 58 secured thereon.

Still another feature of the diverter valve 10 is the simplified construction. It is composed of three rather simple injection molded pieces 42 and 38 with two elastomer seals 44 and 51, an O-ring 47 and caps 41 and 58.

Yet another feature of the valve of this invention is the design of the diverter in that it is easily placed into a faucet housing either manually or by an automatic assembly.

Thus, the invention provides an improved diverter member. While a preferred embodiment has been described above, it should be readily appreciated to those skilled in the art, that a number of modifications and changes may be made without departing from the spirit and scope of the invention. For example, while cap seal 51 has been shown as attached to valve member 42 by cap 58 it could be retained thereon by other fastening means such as a screw. Seal member 44 could be retained in a similar manner. Further, while a cup seal 51 has been described with a lip 59 in conjunction with piston head 45, the seal 51 could have other geometric configurations. Also, the specific materials mentioned are not the only materials which can be used. All such and other modifications within the spirit of the invention are meant to be in the scope thereof.

I claim:

1. A faucet, comprising:

a housing having a fluid inlet leading to a first cavity and a fluid outlet leading from the first cavity;

a valve unit positioned in the cavity for regulating a flow of fluid between the inlet and outlet;

the outlet having a first branch leading to a spout, a second branch leading to a spray member and a second cavity at the intersection of the two branches;

a diverter valve positioned in or adjacent the second cavity, the diverter valve having a sleeve in radial sealing engagement with the first branch, and having an axial passage through the sleeve;

a valve member operatively connected to the sleeve for reciprocal movement relative thereto, the valve member including a first head for opening and closing the passage through the sleeve in one direction, the valve member further including a second head in radial sealing engagement with the second branch, the second head also being constructed and arranged for contact with a valve seat on the sleeve;

whereby when the spray member is closed, the first head is forced to move away from a sealing position and allow fluid flow to the spout, when the spray member is open fluid pressure can cause the diverter valve to close off fluid from entry to the spout and allow fluid flow past the second head into the spray member, and in the event of a pressure reduction in the fluid inlet, fluid flow from the spray member is prevented from entering the second cavity by a one-way seal sealing against a surface of the second branch with back-up protection afforded by the contact of the second head with the valve seat of the sleeve.

2. The faucet of claim 1, wherein the valve member includes a neck portion interconnecting the first and second heads.

3. The faucet of claim 2, wherein the second head is of a larger diameter than the first head.

4. The faucet of claim 2, wherein the valve member has guide flanges for guiding reciprocal movement of the valve member in the sleeve.

5. The faucet of claim 1, wherein the sleeve includes a waist having a reduced diameter portion with at least one opening in the reduced diameter portion positioned adjacent the cavity.

6. The faucet of claim 1, wherein the sleeve has at least one projection for retentive contact with the faucet housing.

* * * * *